United States Patent
Chun et al.

(10) Patent No.: US 11,023,572 B2
(45) Date of Patent: Jun. 1, 2021

(54) AUGMENTED REALITY OBJECT PROVIDING METHOD AND SERVER USING IMAGE AUTHENTICATION

(71) Applicant: Jong Yoon Chun, Seoul (KR)

(72) Inventors: Sol Jee Chun, Seoul (KR); Youngwook Kim, Seoul (KR)

(73) Assignee: Jong Yoon Chun (KR)

( * ) Notice: Subject to any disclaimer, the term of this patent is extended or adjusted under 35 U.S.C. 154(b) by 114 days.

(21) Appl. No.: 16/343,173

(22) PCT Filed: Oct. 19, 2017

(86) PCT No.: PCT/KR2017/011616
§ 371 (c)(1),
(2) Date: Apr. 18, 2019

(87) PCT Pub. No.: WO2018/074870
PCT Pub. Date: Apr. 26, 2018

(65) Prior Publication Data
US 2019/0318076 A1    Oct. 17, 2019

(30) Foreign Application Priority Data

Oct. 19, 2016    (KR) .................. 10-2016-0136074

(51) Int. Cl.
*H04W 4/029*    (2018.01)
*G06F 21/36*    (2013.01)
(Continued)

(52) U.S. Cl.
CPC ......... *G06F 21/36* (2013.01); *G06K 9/00671* (2013.01); *G06T 19/006* (2013.01); *H04W 4/021* (2013.01); *H04W 4/029* (2018.02)

(58) Field of Classification Search
CPC .............. H04L 29/06034; H04L 67/38; H04M 2203/359; A63F 2300/8082; G06T 19/006; G06T 11/60; H04W 4/021; H04W 4/029
See application file for complete search history.

(56) References Cited

U.S. PATENT DOCUMENTS 6,377,793 B1 *    4/2002  Jenkins ................... H04L 51/38
                                                       455/412.1
6,681,107 B2    1/2004  Jenkins et al.
(Continued)

FOREIGN PATENT DOCUMENTS

KR          10-0677502 B1    1/2007
KR       2010-0124947 A     11/2010
(Continued)

OTHER PUBLICATIONS

International Search Report (in English and Korean) and Written Opinion (in Korean) issued in PCT/KR2017/011616, dated Feb. 8, 2018; ISA/KR.

*Primary Examiner* — Matthew T Henning
(74) *Attorney, Agent, or Firm* — Harness, Dickey & Pierce, P.L.C.

(57) ABSTRACT

The present invention relates to an augmented reality object providing method and server using image authentication and, more specifically, to an augmented reality object providing method and server using image authentication, wherein an augmented reality object is registered using a first real-world image captured by a first mobile terminal and an input message, and according to the registration of the augmented reality object, a notification message is transmitted to a second mobile terminal corresponding to recipient information, so as to allow a second user of the second mobile terminal to experience augmented reality by output- (Continued)

ting the registered augmented reality object in a second real-world image captured by the second mobile terminal.

16 Claims, 11 Drawing Sheets

(51) Int. Cl.
    *G06K 9/00*         (2006.01)
    *G06T 19/00*      (2011.01)
    *H04W 4/021*     (2018.01)

(56)             References Cited

U.S. PATENT DOCUMENTS

| | | | |
|---|---|---|---|
| 7,844,229 B2 * | 11/2010 | Gyorfi | H04W 4/029 |
| | | | 455/70 |
| 9,179,278 B2 | 11/2015 | Das et al. | |
| 2007/0024527 A1 * | 2/2007 | Heikkinen | H04M 1/72544 |
| | | | 345/9 |
| 2010/0081416 A1 * | 4/2010 | Cohen | H04L 67/38 |
| | | | 455/414.1 |
| 2011/0208817 A1 * | 8/2011 | Toledano | H04W 4/026 |
| | | | 709/206 |
| 2018/0376224 A1 | 12/2018 | Chun et al. | |

FOREIGN PATENT DOCUMENTS

| | | |
|---|---|---|
| KR | 2012-0009873 A | 2/2012 |
| KR | 2013-0082530 A | 7/2013 |
| KR | 2015-0039233 A | 4/2015 |
| WO | 2015-050288 A1 | 4/2015 |

* cited by examiner (a)

(b)

ID
AUGMENTED REALITY OBJECT PROVIDING METHOD AND SERVER USING IMAGE AUTHENTICATION

TECHNICAL FIELD

The present disclosure relates to an augmented reality object providing method and server using image authentication, and more particularly, to an augmented reality object providing method and server using image authentication, wherein an augmented reality object is registered using a first real-world image captured by a first mobile terminal and an input message, and according to the registration of the augmented reality object, a notification message is transmitted to a second mobile terminal corresponding to recipient information, so as to allow a second user of the second mobile terminal to experience augmented reality by outputting the registered augmented reality object in a second real-world image captured by the second mobile terminal.

BACKGROUND ART

In the usage environment of a general mobile device, a user may easily transfer or register information to/in users of other mobile devices through his/her personal mobile device. Particularly, a simple message service (SMS) using the mobile device has been used as a main information transfer application of mobile devices since mobile devices have been developed.

Furthermore, in addition to the simple message service (SMS) for transmitting simple text, a multimedia message service (MMS), which transmits multimedia text messages between mobile devices, is widely used by a large number of users because it is possible to transmit various types of multimedia data.

Thereafter, as smart phones have widely spread to users of mobile devices, social networking services (SNS) based on a social relationship between users of mobile devices are used as applications for transferring and registering various types of information.

Such social networking services (SNS) are used globally or used in specific countries or groups. For example, Facebook, Twitter, Instagram, Google+ and the like are being used by users around the world, while Kakaotalk is mainly being used by Korean users and Line is mainly being used by Japanese users.

The services capable of providing or registering information as described above have been variously developed and are being used through mobile devices, and information to be posted has been extended to various types of multimedia data including text. That is, with the development of society, there are new demands of users for various types of information and information providing services and thus various types of information and information providing services have been developed.

U.S. Pat. No. 6,681,107 (registered on Jan. 20, 2004 and filed by Xybernaut), entitled "System and method of accessing and recording messages at coordinate way points," which is the related art 1, discloses a technology capable of allowing a user to merely push a button in a specific location to store the location and then to store a description of the stored location through 'voice recording'.

That is, in the related art 1, it is possible to provide location information, in addition to existing text and multimedia data, as a message according to various demands of users. However, the technology of providing the location information as the message merely transfers generated information to one's own self or other users, the message is merely different from the existing text and multimedia data in terms of the type and kind of information, and the same type of message transmission method or providing method is used.

Furthermore, recently, an augmented reality service for providing information in which various pieces of data is combined with a real-world image has been developed and provides augmented reality information through mobile devices.

U.S. Pat. No. 9,179,278 (registered on Nov. 3, 2015 and filed by Qualcomm), entitled "*Systems and methods involving augmented menu using mobile device*," which is the related art 2, discloses a technology in which, when a user of a mobile device transmits a real-world image (including location information) to an augmented reality server by using the mobile device in a location of a restaurant and the like, the augmented reality server parses text in the real-world image and transmits augmented reality data corresponding to the recognized location and the text to the mobile device, so that the mobile device can output augmented reality information.

In the related art 2, the augmented reality server, which provides the mobile device with the augmented reality information, has already stored various types of augmented reality information therein and transmits matching augmented reality information to the mobile device on the basis of the location information and the real-world image, which are transmitted from the mobile device, so that the mobile device combines the received augmented reality information with the real-world image and outputs the combined information, thereby providing a user with a new type of information.

However, in the related art 2, since the augmented reality information, which is a new type of information, is stored in the augmented reality server, matches a specific condition (the location information and the real-world image), and is transmitted to the mobile device, there is a problem that a user may receive only standardized information and may not perform processing for obtaining user-oriented information such as information generation, edition, and deletion using the mobile device and may not provide the processed information.

Korean Patent No. 677502, entitled "Message composing method in mobile communication terminal based on augmented reality and its mobile communication terminal," which is the related art 3, discloses a technology in which a real image including a marker is captured through a mobile terminal of a user, a corresponding virtual object is augmented with the real image through the recognition of the captured marker and is outputted, and a user message is added to the real image as needed and is then transferred to another user.

The related art 3 provides a messaging service in which the virtual object is augmented with the real image through the marker recognition and is outputted, the user message is also outputted, and the augmented virtual object is transmitted to a mobile terminal of another user in the form of a message.

However, the related art 3 has a problem that the real image augmented with the virtual object and the user message added to the real image are transferred to another user, so that the other user indirectly experiences augmented reality by confirming the transmitted real image, virtual object, and message and is not able to experience direct augmented reality in which the virtual object is directly augmented in the real image and is outputted.

That is, there is no interaction using augmented reality information that enables users to generate and experience an augmented reality object by themselves using a mobile terminal and the like, and there is a problem that mutual interest or favorable impression for the augmented reality information is not increased.

CITATION LIST (Patent Literature 1) U.S. Pat. No. 6,681,107 (registered on Jan. 20, 2004)
(Patent Literature 2) U.S. Pat. No. 9,179,278 (registered on Nov. 3, 2015)
(Patent Literature 3) Korean Patent No. 677502 (registered on Jan. 26, 2007)

DISCLOSURE

Technical Problem

Accordingly, the present disclosure has been made while keeping the above-described problems occurring in the related art in consideration, and the present disclosure proposes an augmented reality object providing method and server using image authentication in which users can generate augmented reality information by themselves and other users designated by the user can receive an augmented reality experience service by using the information.

Furthermore, the present disclosure proposes an augmented reality object providing method and server using image authentication in which, when a first user captures a first real-world image in a specific location by using a first mobile terminal and an augmented reality object is generated corresponding to a user set image selected by the first user and is stored in the augmented reality object providing server, the augmented reality object providing server transmits the augmented reality object to a second mobile terminal of a second user if a specific condition is satisfied.

Furthermore, the present disclosure proposes an augmented reality object providing method and server using image authentication in which, when the augmented reality object generated by the first user is registered in the augmented reality object providing server, the augmented reality object providing server transmits a notification message notifying the registration of the augmented reality object to the second mobile terminal of the second user before transmitting the augmented reality object to the second mobile terminal, thereby enabling the second user to actively confirm the augmented reality object.

Furthermore, the present disclosure proposes an augmented reality object providing method and server using image authentication in which, when the augmented reality object generated by the first user in correspondence to the user set image in the first real-world image is registered in the augmented reality object providing server, the second user captures a second real-world image through the second mobile terminal in order to confirm the registered augmented reality object, and an image identical to the user set image exists in the captured second real-world image, the augmented reality object is provided.

Furthermore, the present disclosure proposes an augmented reality object providing method and server using image authentication in which, when an augmented reality object generated using a first real-world image captured by the second user in a specific location is registered in the augmented reality object providing server and then the second user captures a second real-world image through the second mobile terminal in order to confirm the registered augmented reality object, the augmented reality object is provided if the capturing location of the second real-world image is within a critical range set from the specific location.

Furthermore, the present disclosure proposes an augmented reality object providing method and server using image authentication in which only a receiver set by the first user having registered the augmented reality object is allowed to receive the augmented reality object, so that the generated augmented reality object is prevented from being transmitted even though a second real-world image including the same image as a user set image corresponding to the augmented reality object is captured in the capturing location of the first real-world image.

Furthermore, the present disclosure proposes an augmented reality object providing method and server using image authentication in which a notification message, which is generated as the augmented reality object generated using the first real-world image captured by the first user in the specific location is registered in the augmented reality object providing server, is transmitted to the second mobile terminal of the second user when the second mobile terminal is located within a critical range set from the specific location, so that it is possible to provide an event through the confirmation of the augmented reality object.

Furthermore, the present disclosure proposes an augmented reality object providing method and server using image authentication in which an augmented reality object including various events (discount, free gifts and the like) is registered in the augmented reality object providing server and a notification message notifying the registration is provided to customers, so that it is possible to induce the customers to visit a store because the customers should visit the store to confirm the augmented reality object including the events.

Furthermore, the present disclosure proposes an augmented reality object providing method and server using image authentication in which, when the augmented reality object generated by the first user is provided to the second user, since the augmented reality object is not directly transferred and registration of the augmented reality object is transferred to the second user through a notification message, specific conditions such as the capturing location of the first real-world image and the user set image in the captured first real-world image are allowed to be satisfied in order for the second user to confirm the augmented reality object, thereby providing another curiosity, interest and the like to the transfer of the augmented reality object.

Technical Solution

According to an aspect of the present disclosure, an augmented reality object providing method using image authentication includes: a first mobile terminal information reception step in which an augmented reality object providing server receives, from a first mobile terminal, a captured first real-world image, first location information on a first location in which the first real-world image has been captured, user set image information selected in the first real-world image, an input message, and at least one recipient information; an image setting step in which the augmented reality object providing server sets a user set image included in the first real-world image as a first image by using the user set image information; an augmented reality object registration step in which the augmented reality object providing server registers the input message inputted by a first user of the first mobile terminal as an augmented reality object for the first image; a notification message transmission step in which the augmented reality object providing server generates a notification message and transmits the notification message to a second mobile terminal corresponding to the recipient information; a second mobile terminal information reception step in which the augmented reality object providing server receives, from the second mobile terminal, a captured second real-world image and second location information on a second location in which the second real-world image has been captured; a user authentication step in which the augmented reality object providing server determines whether the second mobile terminal corresponds to the recipient information; a location comparison step in which the augmented reality object providing server determines whether the first location information on the first location in which the first real-world image has been captured and the second location information on the second location in which the second real-world image has been captured are within a preset critical range; an image comparison step in which the augmented reality object providing server determines whether a second image corresponding to the first image exists in the second real-world image; and an augmented reality object transmission step in which, if it is determined that the second mobile terminal corresponds to the recipient information in the user authentication step, the first location information and the second location information are within the preset critical range in the location comparison step, and the second image corresponding to the first image exists in the image comparison step, the augmented reality object providing server transmits the augmented reality object corresponding to the first image to the second mobile terminal such that the augmented reality object is outputted in the second real-world image of the second mobile terminal.

In the augmented reality object providing method using image authentication according to an embodiment of the present disclosure, in the location comparison step, the first location information may be included in attribution information of the first real-world image, and the second location information may be included in attribution information of the second real-world image.

In the augmented reality object providing method using image authentication according to an embodiment of the present disclosure, in the first mobile terminal information reception step, the user set image information may include at least one of a name of the user set image, a location of the user set image, an outmost edge of the user set image, and the user set image.

In the augmented reality object providing method using image authentication according to an embodiment of the present disclosure, in the first mobile terminal information reception step, the input message may be data inputted to or stored in the first mobile terminal, and may include at least one of text, image, animation, and sound (including voice).

In the augmented reality object providing method using image authentication according to an embodiment of the present disclosure, in the notification message transmission step, the notification message may include at least one of the first location information on the first location in which the first real-world image has been captured and the first image.

In the augmented reality object providing method using image authentication according to an embodiment of the present disclosure, in the first mobile terminal information reception step, the recipient information may be recipient information included in at least one of applications installed in the first mobile terminal.

In the augmented reality object providing method using image authentication according to an embodiment of the present disclosure, in the notification message transmission step, the notification message may be transmitted through an application server of an application corresponding to the recipient information.

In the augmented reality object providing method using image authentication according to an embodiment of the present disclosure, in the notification message transmission step, the augmented reality object providing server may compare current location information received from the second mobile terminal with the first location information, and if a distance between the current location information and the first location information is within a critical region, the augmented reality object providing server may transmit the generated notification message to the second mobile terminal.

According to another aspect of the present disclosure, an augmented reality object providing server using image authentication includes: a storage receives, from a first mobile terminal, a first real-world image, first location information on a first location in which the first real-world image has been captured, user set image information selected in the first real-world image, an input message, and at least one recipient information; a controller that sets a user set image included in the first real-world image as a first image by using the user set image information, and registers the input message inputted by a first user of the first mobile terminal as an augmented reality object for the first image; a notification message generator that generates a notification message; a message transmitter that transmits the notification message to a second mobile terminal corresponding to the recipient information; a user authenticator that determines whether the second mobile terminal corresponds to the recipient information if a captured second real-world image and second location information on a second location in which the second real-world image has been captured are received from the second mobile terminal; a location comparator that determines whether the first location information and the second location information are within a preset critical range if the captured second real-world image and the second location information on the second location in which the second real-world image has been captured are received from the second mobile terminal; and an image comparator that determines whether a second image corresponding to the first image exists in the second real-world image if the captured second real-world image and the second location information on the second location in which the second real-world image has been captured are received from the second mobile terminal; and wherein, if the user authenticator determines that the second mobile terminal corresponds to the recipient information, the location comparator determines that the first location information and the second location information are within the preset critical range, and the image comparator determines that the second image corresponding to the first image exists, the message transmitter transmits the augmented reality object corresponding to the first image to the second mobile terminal such that the augmented reality object is outputted in the second real-world image of the second mobile terminal.

In the augmented reality object providing server using image authentication according to an embodiment of the present disclosure, the first location information may be included in attribution information of the first real-world image, and the second location information may be included in attribution information of the second real-world image.

In the augmented reality object providing server using image authentication according to an embodiment of the present disclosure, the user set image information may include at least one of a name of the user set image, a location of the user set image, an outmost edge of the user set image, and the user set image.

In the augmented reality object providing server using image authentication according to an embodiment of the present disclosure, the input message may be data inputted to or stored in the first mobile terminal, and may include at least one of text, image, animation, and sound (including voice).

In the augmented reality object providing server using image authentication according to an embodiment of the present disclosure, the notification message may include at least one of the first location information on the first location in which the first real-world image has been captured and the first image.

In the augmented reality object providing server using image authentication according to an embodiment of the present disclosure, the recipient information may be recipient information included in at least one of applications installed in the first mobile terminal.

In the augmented reality object providing server using image authentication according to an embodiment of the present disclosure, the message transmitter may transmit the notification message through an application server of an application corresponding to the recipient information.

In the augmented reality object providing server using image authentication according to an embodiment of the present disclosure, if the location comparator compares current location information received from the second mobile terminal with the first location information and determines that a distance between the current location information and the first location information is within a critical region, the message transmitter may additionally transmit the notification message to the second mobile terminal.

Advantageous Effects

As set forth above, in accordance with the augmented reality object providing method and server using image authentication according to the present disclosure, users can generate augmented reality information by themselves and other users designated by the user can receive an augmented reality experience service by using the information.

In accordance with the augmented reality object providing method and server using image authentication according to the present disclosure, when a first user captures a first real-world image in a specific location by using a first mobile terminal and an augmented reality object is generated corresponding to a selected user set image and is stored in the augmented reality object providing server, the augmented reality object providing server transmits the augmented reality object to a second mobile terminal of a second user if a specific condition is satisfied, so that both the first user and the second user can experience augmented reality.

In accordance with the augmented reality object providing method and server using image authentication according to the present disclosure, when the augmented reality object generated by the first user is registered in the augmented reality object providing server, the augmented reality object providing server transmits a notification message notifying the registration of the augmented reality object to the second mobile terminal of the second user before transmitting the augmented reality object to the second mobile terminal, so that the second user can recognize the registration of the augmented reality object through the notification message and actively confirm the augmented reality object.

In accordance with the augmented reality object providing method and server using image authentication according to the present disclosure, when the augmented reality object generated by the first user in correspondence to the user set image in the first real-world image is registered in the augmented reality object providing server, the second user captures a second real-world image through the second mobile terminal in order to confirm the registered augmented reality object, and an image identical to the user set image exists in the captured second real-world image, the augmented reality object is provided, so that experience of the first user is induced to the second user and thus the experience can be shared.

In accordance with the augmented reality object providing method and server using image authentication according to the present disclosure, when an augmented reality object generated using a first real-world image captured by the second user in a specific location is registered in the augmented reality object providing server and then the second user captures a second real-world image through the second mobile terminal in order to confirm the registered augmented reality object, the augmented reality object is provided if the capturing location of the second real-world image is within a critical range set from the specific location, so that the second user can share a real-world location experienced by the first user.

In accordance with the augmented reality object providing method and server using image authentication according to the present disclosure, only a receiver set by the first user having registered the augmented reality object is allowed to receive the augmented reality object, so that the generated augmented reality object is prevented from being transmitted even though a second real-world image including the same image as a user set image corresponding to the augmented reality object is captured in the capturing location of the first real-world image, thereby maintaining data security by preventing the augmented reality object from being leaked by an arbitrary user.

In accordance with the augmented reality object providing method and server using image authentication according to the present disclosure, an augmented reality object including various events (discount, free gifts and the like) is registered in the augmented reality object providing server and a notification message notifying the registration is provided to customers, so that it is possible to induce the customers to visit a store because the customers should visit the store to confirm the augmented reality object including the events.

In accordance with the augmented reality object providing method and server using image authentication according to the present disclosure, when the augmented reality object generated by the first user is provided to the second user, since the augmented reality object is not directly transferred and registration of the augmented reality object is transferred to the second user through a notification message, specific conditions such as the capturing location of the first real-world image and the user set image in the captured first real-world image are allowed to be satisfied in order for the second user to confirm the augmented reality object, so that it is possible to provide another curiosity, interest and the like to the transfer of the augmented reality object.

DESCRIPTION OF REFERENCE NUMERALS

Figure 1:
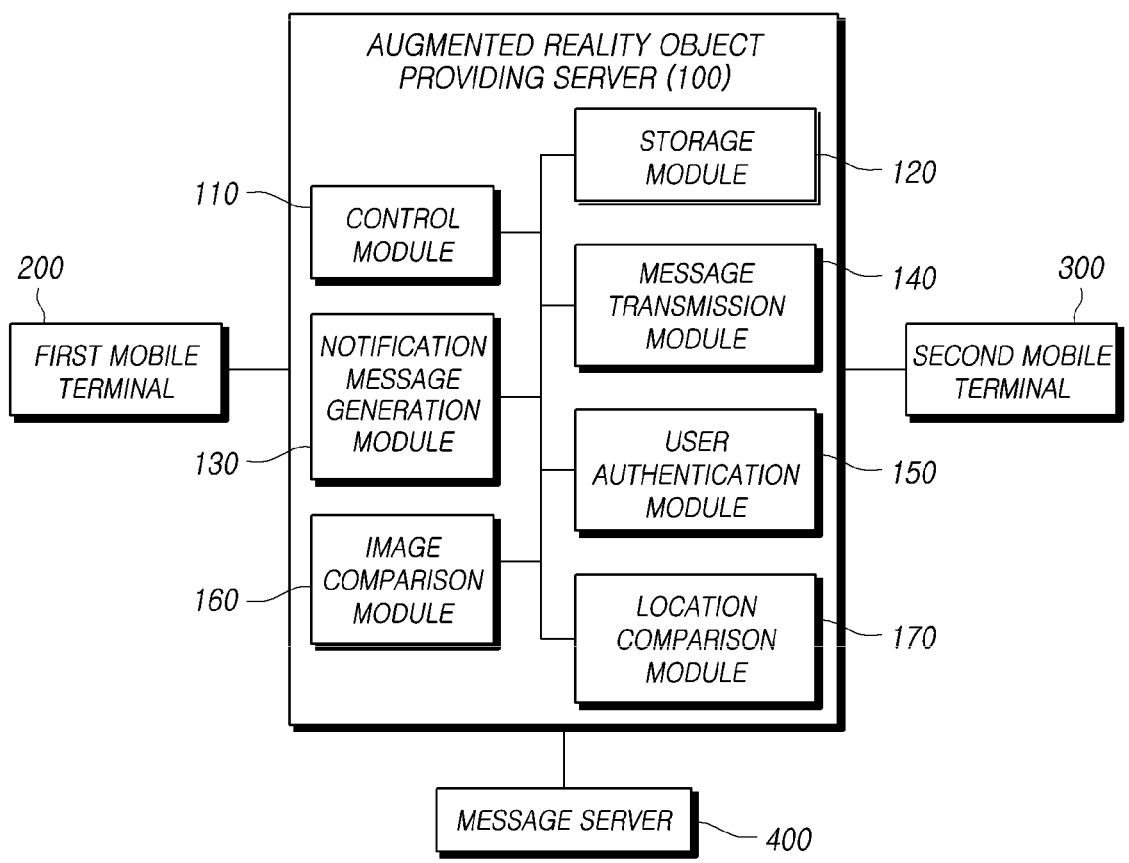
FIG. 1 is a configuration diagram illustrating an augmented reality object providing server according to the present disclosure.

100: Augmented reality object providing server
110: Control module
120: Storage module
130: Notification message generation module
140: Message transmission module
150: User authentication module
160: Image comparison module
170: Location comparison module
200: First mobile terminal
300: Second mobile terminal
400: Message server
510: First real-world image
520: Input message
530: User set image information
620: Augmented reality object
630, 720: Augmented reality object
710: Notification message
730: Second real-world image

MODE FOR INVENTION

The terms or words used in this specification and claims are not limited to typical or dictionary definitions, but should be interpreted as meanings and concepts, which coincide with the technical idea of the present invention, on the basis of a principle in which the inventor can define terms and concepts in order to explain his/her invention in a best way.

Accordingly, embodiments described in this specification and configurations illustrated in the drawings are preferred embodiments of the present invention, and do not represent the entire technical idea of the present invention. Thus, various equivalents and modifications capable of replacing the embodiments and configurations may be provided at the time of filing the present application.

Throughout the specification, when an element "includes" a component, it means that the element does not exclude another component but may further include another component unless referred to the contrary. Furthermore, a term such as "module," "unit," "server," and "system" described in this specification means a unit for processing at least one function or operation, and this may be implemented with hardware, software, or a combination of the hardware and the software and may be included in one device or another device.

Hereinafter, with reference to the drawings, an augmented reality object providing method using an augmented reality object providing server according to the present disclosure will be described.

FIG. 1 is a configuration diagram illustrating an augmented reality object providing server according to the present disclosure. As illustrated in FIG. 1, an augmented reality object providing server 100 includes a storage module 120, a control module 110, a notification message generation module 130 that generates a notification message, a message transmission module 140, a user authentication module 150, a location comparison module 170, and an image comparison module 160. The storage module 120 stores a first real-world image transmitted from a first mobile terminal 200, first location information on a first location in which the first real-world image has been captured, user set image information selected in the first real-world image, an input message, and at least one recipient information. The control module 110 sets a user set image included in the first real-world image as a first image by using the user set image information, and registers the input message inputted by a first user of the first mobile terminal 200 as an augmented reality object for the first image. The message transmission module 140 transmits the notification message to a second mobile terminal 300 corresponding to the recipient information. The user authentication module 150 determines whether the second mobile terminal 300 corresponds to the recipient information if a captured second real-world image and second location information on a second location in which the second real-world image has been captured are received from the second mobile terminal 300. The location comparison module 170 determines whether the first location information and the second location information are within a preset critical range if the captured second real-world image and the second location information on the second location in which the second real-world image has been captured are received from the second mobile terminal 300. The image comparison module 160 determines whether a second image corresponding to the first image exists in the second real-world image if the captured second real-world image and the second location information on the second location in which the second real-world image has been captured are received from the second mobile terminal 300. When the user authentication module 150 determines that the second mobile terminal 300 corresponds to the recipient information, the location comparison module 170 determines that the first location information and the second location information are within the critical range, and the image comparison module 160 determines that the second image corresponding to the first image exists, the message transmission module 140 transmits an augmented reality object corresponding to the first image to the second mobile terminal 300 such that the augmented reality object may be outputted in the second real-world image of the second mobile terminal 300.

The first location information and the second location information may be included in attribution information of the first real-world image and the second location information may be included in attribution information of the second real-world image.

The storage module 120 stores the first real-world image, the user set image information, the input message, and the recipient information transmitted from the first mobile terminal 200, and receives and stores the second real-world image transmitted from the second mobile terminal 300.

The user set image information stored in the storage module 120 includes at least one of a name of the user set image, the outmost edge of the user set image, a location of the user set image, and the user set image. The input message is data inputted to or stored in the first mobile terminal 200, and includes at least one of various types of multimedia data such as text, image, animation, and sound (including voice). The image includes at least one of a static image and a dynamic image.

Furthermore, when the control module 110 sets the user set image included in the first real-world image as the first image by using the user set image information, the storage module 120 stores the set first image.

Furthermore, when the control module 110 registers the input message transmitted from the first mobile terminal 200 as the augmented reality object for the first image, the storage module 120 stores the registered augmented reality object.

Furthermore, when the notification message generation module 130 generates the notification message, the storage module 120 stores the generated notification message.

Furthermore, since the recipient information stored in the storage module 120 is recipient information included in at least one of SNS applications installed in the first mobile terminal 200, the recipient information further includes information on the type and the like of the application. Preferably, the SNS applications installed in the first mobile terminal 200 can transmit data such as a message.

The control module 110 controls each element in the augmented reality object providing server 100, and particularly, sets the user set image included in the first real-world image as the first image by using the user set image information received from the first mobile terminal 200.

That is, the control module 110 may extract the user set image from the first real-world image by using the user set image information for extracting the user set image selected by the first user who is a user of the first mobile terminal 200, and sets the user set image extracted from the first real-world image as the first image.

The set first image is an image used for image comparison in order to transmit an augmented reality object to the second mobile terminal 300, and when the second image corresponding to the set first image exists in the second real-world image transmitted from the second mobile terminal 300, the augmented reality object is transmitted to the second mobile terminal 300 such that the augmented reality object can be transmitted to the second mobile terminal 300.

Figure 6:
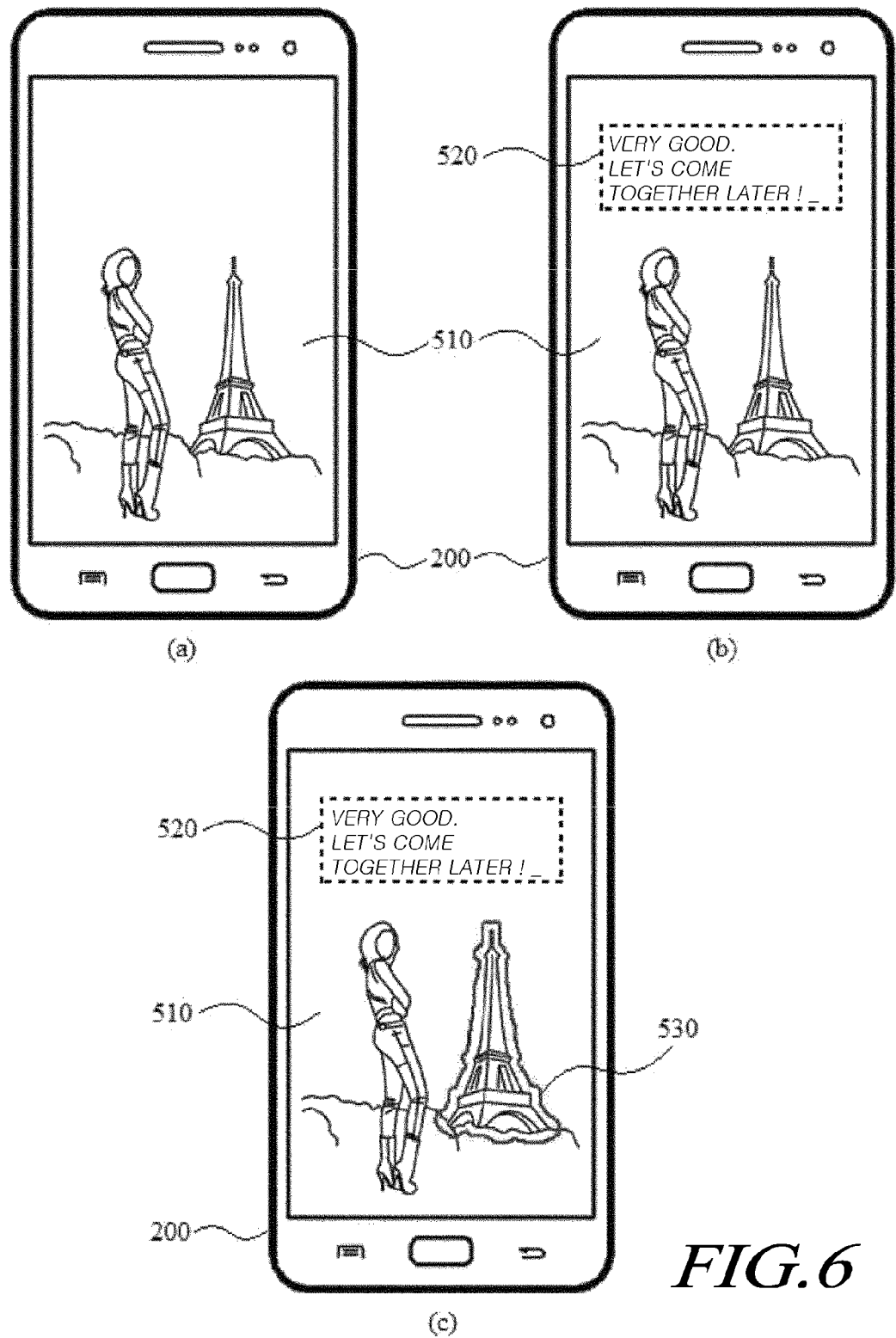
FIG. 6 is an exemplary diagram illustrating information generated by a first mobile terminal according to an embodiment of the present disclosure.
Figure 7:
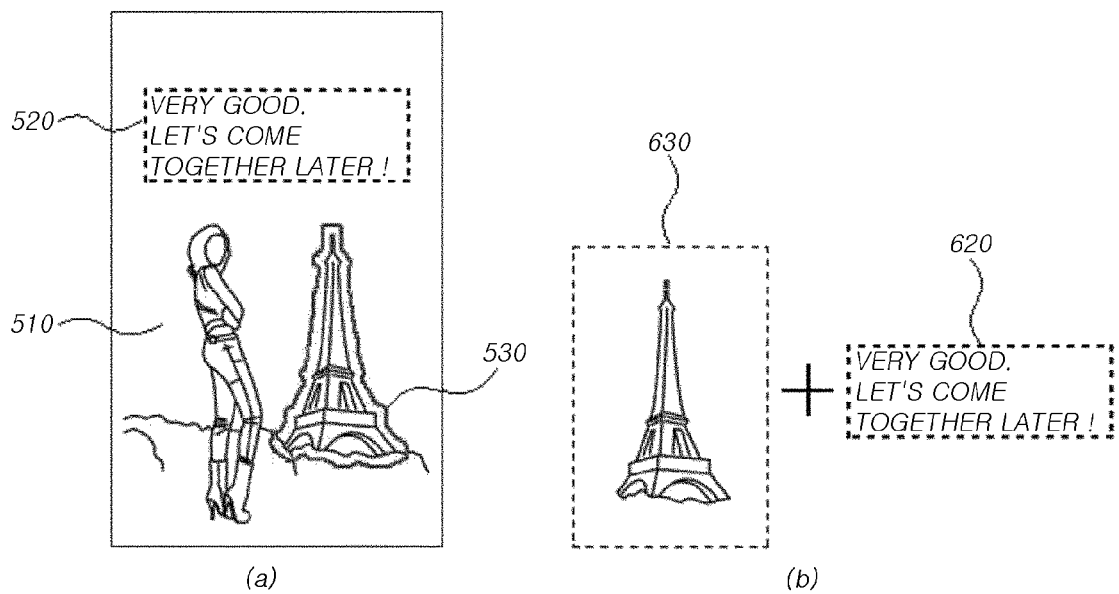
FIG. 7 is an exemplary diagram illustrating that the augmented reality object providing server processes information received from the first mobile terminal according to an embodiment of the present disclosure.

If user set image information 530 is generated by the first user in a first real-world image 510 captured by the first mobile terminal 200 as illustrated in (c) of FIG. 6 and is transmitted to the augmented reality object providing server 100, the control module 110 may extract a user set image (the Eiffel tower) from the first real-world image 510 by using the user set image information 530 and set the extracted user set image as a first image 630 as illustrated in (a) and (b) of FIG. 7.

As a consequence, the set first image 630 is an image that is obtained by extracting a part of the user set image from the first real-world image 510 and is stored alone, and the user set image set as the first image 630 is extracted using the user set image information 530 inputted by the first user.

In such a case, the user set image information may include at least one of the outermost edge of the user set image selected by the first user, the location of the user set image, and the user set image. In addition, any information may be used if it is information for extracting a specific image from the first real-world image. In (c) of FIG. 6, the user set image information 530 is an example corresponding to the outermost edge of the user set image.

Furthermore, the outermost edge of the user set image is generated by dragging a boundary line of an image to be extracted from the first real-world image outputted on the screen of the first mobile terminal 200 and inputting continuous image coordinate values. The control module 110 may extract the user set image by using the user set image information that is the drag input information (the continuous coordinate values in the image).

The location of the user set image is generated by touching or selecting (using an input interface) a specific image to be extracted from the first real-world image outputted on the screen of the first mobile terminal 200 and inputting a specific coordinate value of the image. The control module 110 may extract the user set image by using the user set image information that is the touch input information (the specific coordinate value).

In such a case, the extraction of the user set image is to extract an image located at the coordinate value that is the touch input information, and for example, in one extraction method, surrounding pixels may be analyzed from the location of the coordinate value that is the touch input information in the first real-world image, similar pixels may be designated as a group, and the pixels belonging to the group may be extracted as the user set image.

In another extraction method, an edge of an image corresponding to a coordinate value may be detected from the location of the coordinate value, which is the touch input information in the first real-world image, through an edge detection algorithm, and a user set image having the detected edge may be extracted.

In further another extraction method, a set of pixels within a preset critical pixel distance from the location of the coordinate value, which is the touch input information in the first real-world image, may be designated as a group, and pixels belonging to the group may be extracted as a user set image.

Finally, in relation to the user set image of the user set image information, a user set image itself extracted by editing the first real-world image by the first user in the first mobile terminal 200 may be generated as the user set image information. The control module 110 of the augmented reality object providing server 100 having received the generated user set image information directly sets the user set image, which is the user set image information, as the first image without processing the user set image information.

The control module 110 may register the input message received from the first mobile terminal 200 as an augmented reality object associated with the first image. The augmented reality object is transmitted to the second mobile terminal

300 and is outputted to the second real-world image. The augmented reality object may include at least one of various types of multimedia data such as text, image, animation, and sound (including voice). The image includes at least one of a static image and a dynamic image.

The input message may be data inputted or stored by the first user in the first mobile terminal 200, and is transmitted to the augmented reality object providing server 100 after the type and number of input messages are set by the first user.

The control module 110 stores the input message transmitted from the first mobile terminal 200 in the storage module 120, and may edit the input message as needed before or after the storage.

For example, if the input message transmitted from the first mobile terminal 200 is a static image, a dynamic image, sound and the like, the edition may be performed to change the resolution, size, compression scheme of the image or to reduce a data size and the like so as to be outputted to the second mobile terminal 300.

The control module 110 requests the notification message generation module 130 to generate a notification message. The notification message includes at least one of the first location information on the first location in which the first real-world image has been captured and the first image. Accordingly, the control module 110 may provide the notification message generation module 130 with at least one of the first location information and the first image to be included in the notification message. Alternatively, the notification message generation module 130, which generates the notification message, may receive at least one of the first location information and the first image from the storage module 120.

The control module 110 may request the notification message generation module 130 to generate the notification message after receiving information on the first real-world image and the like from the first mobile terminal 200, after setting the first image, or after registering the input message as the augmented reality object.

If the second real-world image and the second location information on the second location in which the second real-world image has been captured are received from the second mobile terminal 300, the control module 110 requests the user authentication module 150 to perform user authentication in order to confirm whether the second mobile terminal 300 corresponds to the recipient information transmitted from the first mobile terminal 200.

If the second real-world image and the second location information on the second location in which the second real-world image has been captured are received from the second mobile terminal 300, the control module 110 requests the location comparison module 170 to perform location comparison in order to confirm whether the first location information on the first location in which the first real-world image has been captured and the second location information on the second location in which the second real-world image has been captured are within the preset critical range.

The preset critical range is for authenticating that an actual location based on the first location information of the first real-world image captured by the first user and a location based on the second location information of the second real-world image captured by the second user are the same region. A GPS signal and the like for generating the first location information or the second location information has a certain level of tolerance, and in order to solve a location recognition error due to such an error range, it is determined to be the same region from the location based on the first location information to a location within the critical range.

The first location information and the second location information are preferably generated by GPS signals of the respective first mobile terminal 200 and second mobile terminal 300, but may alternatively be generated by information of a base transceiver station (BTS) connected to the first mobile terminal 200 or the second mobile terminal 300 or a time difference of radio waves transmitted from the base transceiver station.

Furthermore, it is possible to generate location information based on an administrative district (including an address). For example, it is possible to generate location information through coordinate (latitude and longitude) conversion based on the administrative district (an address and the like).

If the second real-world image and the second location information on the second location in which the second real-world image has been captured are received from the second mobile terminal 300, the control module 110 requests the image comparison module 160 to perform the comparison of the second real-world image and the first image in order to confirm whether the second image corresponding to the first image exists in the second real-world image transmitted by the second mobile terminal 300.

In such a case, at least one of the location comparison in the location comparison module 170 and the image comparison in the image comparison module 160 is performed according to data transmitted from the second mobile terminal 300. For example, if both the first location information and the first image are included in the notification message, both of the data transmitted from the second mobile terminal 300 are compared with each other.

However, if only one of the first location information and the first image is included in the notification message, the first location information or the first image, which corresponds to the notification message of the second real-world image transmitted from the second mobile terminal 300 and is included in the notification message, is compared with the second real-world image.

As a consequence, if the second real-world image and the second location information on the second location in which the second real-world image has been captured are received from the second mobile terminal 300, at least one of the user authentication module 150, the location comparison module 170, and the image comparison module 160 may perform the related comparison according to information included in the notification message transmitted to the second mobile terminal 300.

As a consequence, if the second real-world image and the second location information on the second location in which the second real-world image has been captured are received from the second mobile terminal 300, the control module 110 performs the control of at least one of the user authentication module 150, the location comparison module 170, and the image comparison module 160, and may variously change the control sequence of the modules 150, 160, and 170.

If the control module 110 performs the control of at least one of the user authentication module 150, the location comparison module 170, and the image comparison module 160, if the results of the modules 150, 160, and 170 subjected to the control are satisfied, the control module 110 requests the message transmission module 140 to transmit the augmented reality object transmitted to and registered in the first mobile terminal 200 such that the augmented reality object can be superimposed on the second real-world image outputted to the screen of the second mobile terminal 300.

After the transmission of the augmented reality object to the second mobile terminal 300 from the message transmission module 140 is completed, the control module 110 controls the message transmission module 140 such that a completion message indicating the completion of the transmission of the augmented reality object can be transmitted to the first mobile terminal 200.

The completion message is generated in the control module 110, is transferred to the message transmission module 140, and is transmitted to the first mobile terminal 200, or when the control module 110 requests the message transmission module 140 to transmit the completion message, the message transmission module 140 generates the completion message according to the request of the control module 110 and transmits the completion message to the first mobile terminal 200.

If notification message generation is requested by the control module 110, the notification message generation module 130 generates a notification message to be transmitted to the second mobile terminal 300. Preferably, the notification message includes at least one of the first location information and the first image stored in the storage module 120, and may be generated including data such as information on the first user and the user set image as needed.

The notification message may be generated only once for the first time after the augmented reality object is registered, but may be generated in a plural number as needed and transmitted to the second mobile terminal 300. That is, if the second real-world image is not transmitted from the second mobile terminal 300 within a predetermined period after the initial notification message is transmitted to the second mobile terminal 300, at least one additional notification message may be transmitted.

Figure 8:
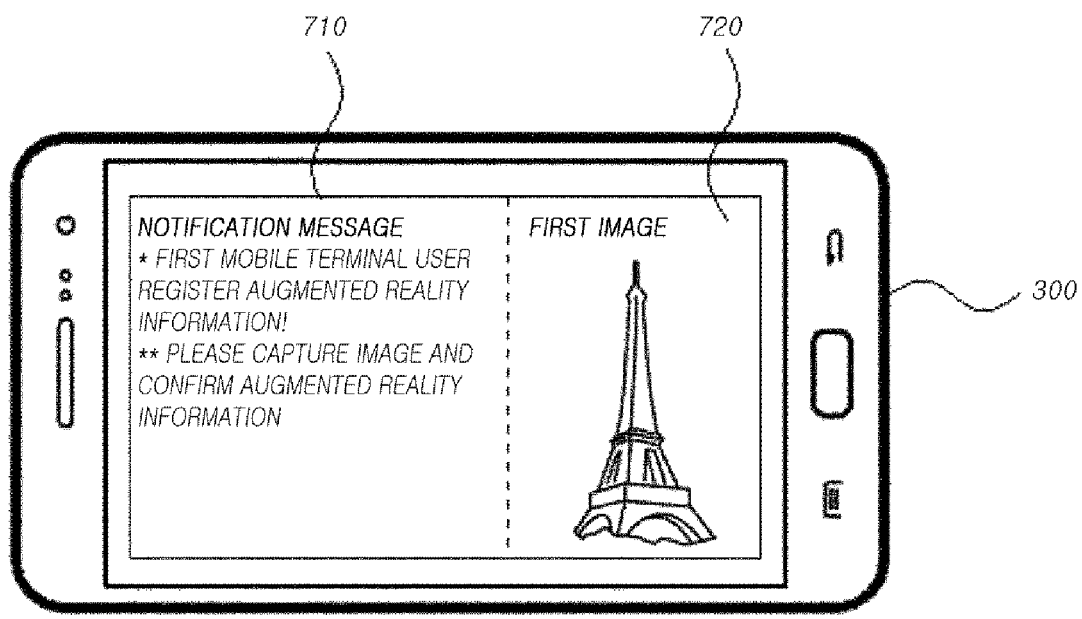
FIG. 8 is an exemplary diagram illustrating that the notification message generated by the augmented reality object providing server is outputted to a second mobile terminal according to an embodiment of the present disclosure.

FIG. 8 is an exemplary diagram illustrating that a notification message generated by the augmented reality object providing server is outputted to the second mobile terminal according to an embodiment of the present disclosure. As illustrated in FIG. 8, a notification message 710 is a message transmitted from the augmented reality object providing server 100 to the second mobile terminal 300 in order to notify the second user of the second mobile terminal 300 that the augmented reality data has been registered using the first real-world image transmitted from the first mobile terminal 200, and may be generated in the form of text and may be generated including a first image 720 set using the user set image extracted from the first real-world image.

The control module 110 requests the notification message generation module 130 to generate a notification message. The notification message includes at least one of the first location information on the first location in which the first real-world image has been captured and the first image. Accordingly, the control module 110 may provide the notification message generation module 130 with at least one of the first location information and the first image stored in the storage module 120, which is to be included in the notification message. Alternatively, the notification message generation module 130, which generates the notification message, may receive at least one of the first location information and the first image from the storage module 120.

Preferably, the control module 110 requests the notification message generation module 130 to generate the notification message after the first image is set or after the augmented reality object is registered, but the request time may differ depending on information to be included in the notification message. For example, if the first image is included in the notification message, the control module 110 may request the generation of the notification message after the setting of the first image is completed. Alternatively, if only the first location information is included in the notification message, the control module 110 may request the generation of the notification message after the first location information on the first location in which the first real-world image has been captured is received from the first mobile terminal.

The message transmission module 140 transmits the generated notification message to the second mobile terminal 300 corresponding to the recipient information transmitted from the first mobile terminal 200, under the control of the control module 110. The message transmission module 140 of the augmented reality object providing server 100 may directly transmit the notification message to the second mobile terminal 300, or may request transmission by providing a message server 400 located at an exterior with the recipient information and the notification message as needed.

Furthermore, under the control of the control module 110, the message transmission module 140 transmits the augmented reality object to the second mobile terminal 300 having transmitted the second real-world image. The message transmission module 140 of the augmented reality object providing server 100 may directly transmit the augmented reality object to the second mobile terminal 300, or may request transmission by providing the message server 400 located at an exterior with the recipient information and the augmented reality object as needed.

That is, if an application corresponding to the recipient information transmitted from the first mobile terminal 200 is an application provided by the augmented reality object providing server 100, the message transmission module 140 may directly transmit the notification message or the augmented reality object to the second mobile terminal 300.

However, if the application corresponding to the recipient information transmitted from the first mobile terminal 200 is another application other than the application provided by the augmented reality object providing server 100, the message transmission module 140 may transmit each message through the message server 400 provided by the other application.

For example, if the first mobile terminal 200 transmits recipient information stored in Facebook application, the message transmission module 140 requests the message server 400 belonging to Facebook to transmit the notification message or the augmented reality object in order to transmit the notification message or the augmented reality object to the second mobile terminal 300.

Accordingly, the message server 400 belonging to Facebook transmits the received notification message or augmented reality object to the second mobile terminal 300.

Furthermore, if the first mobile terminal 200 transmits recipient information stored in Twitter application, the message transmission module 140 requests the message server 400 belonging to Twitter to transmit the notification message or the augmented reality object in order to transmit the notification message or the augmented reality object to the second mobile terminal 300. Accordingly, the message server 400 belonging to Twitter transmits the received notification message or augmented reality object to the second mobile terminal 300.

As described above, the message transmission module 140 may transmit the notification message or the augmented reality object through the external message server 400 according to the applications corresponding to the recipient information. Furthermore, the message transmission module 140 may transmit only at least one of the notification message and the augmented reality object through the message server 400 of the application corresponding to the recipient information, or may transmit the notification message and the augmented reality object to the second mobile terminal 300 without using the external message server 400.

In such a case, the external message server 400 is a server capable of transmitting a message to subscribed members or transmitting a message between the members, and provides a message transmission service to members subscribed using a corresponding application.

After transmitting the augmented reality object to the second mobile terminal 300, the message transmission module 140 transmits a completion message indicating the completion of the transmission of the augmented reality object to the first mobile terminal 200 under the control of the control module 110.

The completion message may be generated by at least one of the control module 110 and the message transmission module 140. According to an embodiment, the control module 110 generates the completion message and may request the message transmission module 140 to transmit the generated completion message to the first mobile terminal 200. According to another embodiment, if the control module 110 sends a request to the message transmission module 140 such that a completion message is transmitted to the first mobile terminal 200, the message transmission module 140 may generate the completion message and transmit the completion message to the first mobile terminal 200.

If the augmented reality object providing server 100 receives the second real-world image and the second location information on the second location in which the second real-world image has been captured from the second mobile terminal 300, the user authentication module 150 performs user authentication regarding whether the second mobile terminal 300 corresponds to the recipient information transmitted from the first mobile terminal 200 under the control of the control module 110.

That is, the user authentication may be performed using information transmitted from the second mobile terminal 300. For example, the information transmitted from the second mobile terminal 300 to perform the user authentication may include a mobile phone number assigned to the second mobile terminal 300, a serial number of the second mobile terminal 300, a medium access control (MAC) address of the second mobile terminal 300, an ID/password of an application for message transmission, and the like.

The user authentication module 150 transmits, to the control module 110, a user authentication result obtained by authenticating the second mobile terminal 300 having transmitted the second real-world image.

The image comparison module 160 performs an image comparison for determining whether the second image corresponding to the first image exists in the second real-world image if the augmented reality object providing server 100 receives the second real-world image and the second location information on the second location in which the second real-world image has been captured from the second mobile terminal 300.

Figure 9:
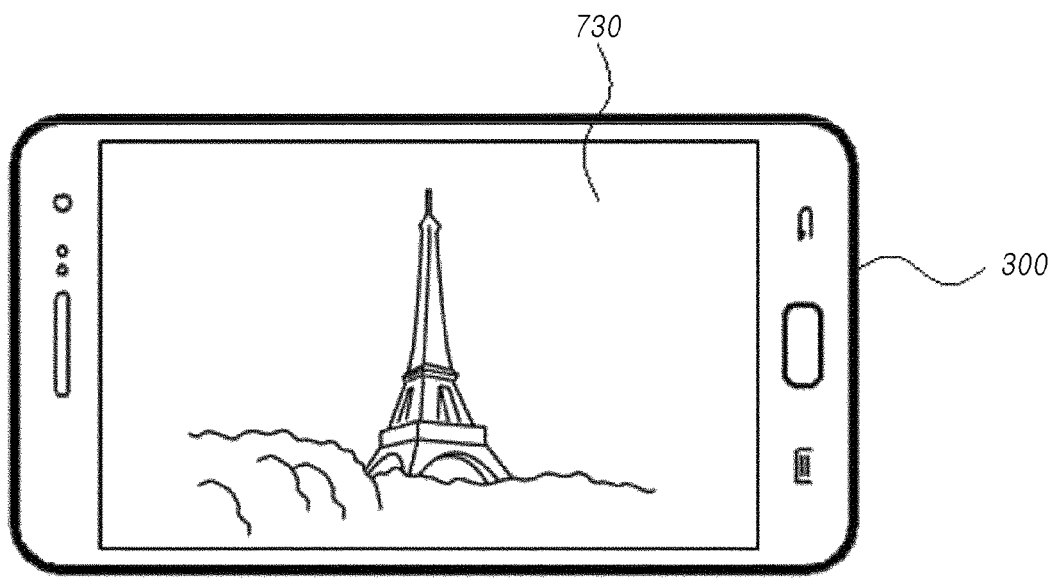
FIG. 9 is an exemplary diagram illustrating a screen obtained by capturing a second real-world image in the second mobile terminal according to an embodiment of the present disclosure.
Figure 10:
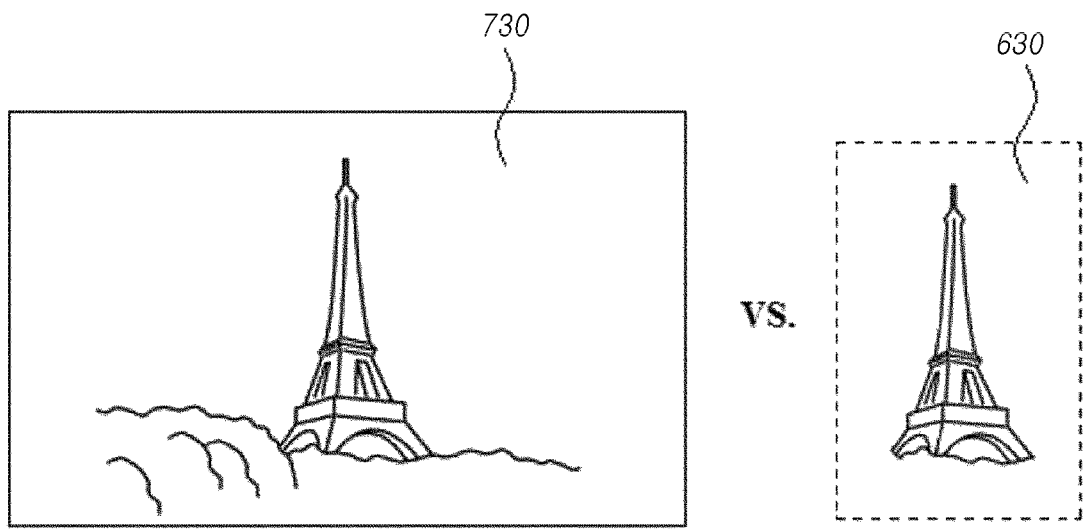
FIG. 10 is an exemplary diagram illustrating that the augmented reality object providing server compares the augmented reality object and the second real-world image with each other according to an embodiment of the present disclosure.
Figure 10:

That is, the image comparison module 160 may determine whether an image corresponding to the first image stored in the storage module 120 is included in the received second real-world image. For example, if a second real-world image 730 captured by the second mobile terminal 300 is transmitted to the augmented reality object providing server 100 as illustrated in FIG. 9, the image comparison module 160 may compare the received second real-world image 730 and the first image 630 with each other and determine whether a second image corresponding to the first image 630 is included in the received second real-world image as illustrated in FIG. 10.

The image comparison module 160 transmits, to the control module 110, a comparison result regarding whether the second image corresponding to the first image 630 exists in the second real-world image 730.

According to another embodiment of the present disclosure, the image comparison module 160 may not be provided in the augmented reality object providing server 100, and provided in the second mobile terminal 300. If the image comparison module 160 is provided in the second mobile terminal 300, the image comparison module 160 compares the first image included in the notification message with the second real-world image captured by the second mobile terminal 300.

In such a case, the second mobile terminal 300 may not transmit the captured second real-world image to the augmented reality object providing server 100, and the image comparison module 160 performs an image comparison for determining whether the second image corresponding to the first image is included in the second real-world image.

That is, if the image comparison module 160 is provided in the second mobile terminal 300 and the first image is transmitted to the second mobile terminal 300 through the notification message, the second mobile terminal 300 may not transmit the captured second real-world image to the augmented reality object providing server 100, compares the second real-world image with the first image received through the notification message through the image comparison module 160 provided therein, and determines whether the second image corresponding to the first image is included in the second real-world image.

The second mobile terminal 300 transmits, to the control module 110 of the augmented reality object providing server 100, a result of the comparison performed by the image comparison module 160 to determine whether the second image corresponding to the first image exists in the second real-world image.

According to another embodiment of the present disclosure, if the image comparison module 160 is provided in the second mobile terminal 300, after image comparison is completed in the second mobile terminal 300, user authentication and location comparison are performed through the user authentication module 150 and the location comparison module 170 of the augmented reality object providing server 100. Accordingly, the second mobile terminal 300 transmits related information on the user authentication result to the augmented reality object providing server 100.

After the image comparison is completed, the related information transmitted from the second mobile terminal 300 to the augmented reality object providing server 100 includes information for the user authentication and information for performing the location comparison.

If the augmented reality object providing server 100 receives the second real-world image and the second location information on the second location in which the second real-world image has been captured from the second mobile terminal 300, the location comparison module 170 performs a location comparison for confirming whether the first location information on the first location in which the first mobile terminal 200 has captured the first real-world image and the second location information on the second location in which the second mobile terminal 300 has captured the second real-world image are within a mutually set critical range.

That is, the location comparison module 170 may compare locations in which the first real-world image and the second real-world image have been captured with each other as needed, thereby determining whether the first real-world image and the second real-world image are real-world images captured in the same place. In such a case, preferably, the first location information in the first real-world image and the second location information in the second real-world image use location information included in attribute information of the images. However, if no location information is included in the attribute information of each real-world image, it is possible to use first location information and second location information measured using location recognition modules (not illustrated) provided in the first mobile terminal 200 and the second mobile terminal 300, respectively.

The location comparison module 170 transmits, to the control module 110, a result of the comparison obtained by determining that the first location information and the second location information are within the mutually set critical range.

According to an embodiment of the present disclosure, preferably, the first mobile terminal 200 is described as a terminal that generates an augmented reality object, is used by the first user, and is installed with an application for transmitting information on the first real-world image and the like to the augmented reality object providing server 100.

As needed, the first mobile terminal 200 may access a web page provided by the augmented reality object providing server 100 to transmit information on the first real-world image and the like.

Preferably, the first mobile terminal 200 includes a camera module capable of capturing the first real-world image, and may include a location recognition module (a GPS receiver and the like) capable of generating first location information included in the attribute information of the captured first real-world image.

The first mobile terminal 200 may use a wired or wireless communication medium if transmitting the first real-world image and the like to the augmented reality object providing server 100.

The first mobile terminal 200 may transmit the first real-world image and the like to the augmented reality object providing server 100 through the application provided by the augmented reality object providing server 100, and the application further includes an image editing module (not illustrated) capable of extracting the user set image in the captured first real-world image.

The image editing module may select the user set image in the captured first real-world image by the first user using the first mobile terminal 200. That is, the user set image may be selected by generating user set image information and may be selected using at least one of the outermost edge of the user set image, the location of the user set image, and the user set image. In addition, any information may be used if it is information for extracting a specific image from the first real-world image.

The outermost edge of the user set image is generated by dragging a boundary line of an image to be extracted from the first real-world image outputted on the screen of the first mobile terminal 200 and inputting continuous coordinate values in the image.

The location of the user set image is generated by touching a specific image to be extracted from the first real-world image outputted on the screen of the first mobile terminal 200 and inputting a specific coordinate value of the image.

The outermost edge of the user set image and the location of the user set image may be generated regardless of the image editing module, but the user set image may be directly extracted by editing the first real-world image by using the image editing module.

The first mobile terminal 200 may set the user set image extracted using the image editing module as user set image information, and transmit the set user set image information to the augmented reality object providing server 100.

According to an embodiment of the present disclosure, the second mobile terminal 300 receives a notification message generated in and transmitted from the augmented reality object providing server 100 according to the registration of the augmented reality object. The notification message is transmitted to an application corresponding to recipient information selected by the first mobile terminal 200 and the second mobile terminal 300 may receive the notification message by using the application.

Most preferably, the notification message may be received using the application provided by the augmented reality object providing server 100, but as needed, the notification message may be received using various SNS applications, such as Facebook, Twitter, Instagram, Google+, Kakaotalk, and Line, capable of performing message transmission. In such a case, the augmented reality object providing server 100 may transmit a generated notification message to the second mobile terminal 300 through the message transmission module 140 by using the message server 400 belonging to an external SNS application.

The second mobile terminal 300 may generate the second real-world image captured using the camera module provided therein, and transmit the generated second real-world image and second location information on a second location, in which the second real-world image has been captured, to the augmented reality object providing server 100. In such a case, the second mobile terminal 300 is used by the second user, and the second real-world image, which is captured by the second mobile terminal 300 and is transmitted to the augmented reality object providing server 100, is preferably provided to the augmented reality object providing server 100 and is transmitted using an application installed in the second mobile terminal 300.

As needed, the second mobile terminal 300 may access a web page provided by the augmented reality object providing server 100 through the Internet to transmit the second real-world image.

The message server 400 may be located outside the augmented reality object providing server 100 to transmit a message to the second mobile terminal 300. In such a case, the message server 400 may receive a message and recipient information to be transmitted from the message transmission module 140 of the augmented reality object providing server 100, and transfer the message to the second mobile terminal 300 corresponding to the recipient information.

As needed, the message server 400 may transmit at least one of the notification message and the augmented reality object to the second mobile terminal 300 at the request of the message transmission module 140.

Figure 3:
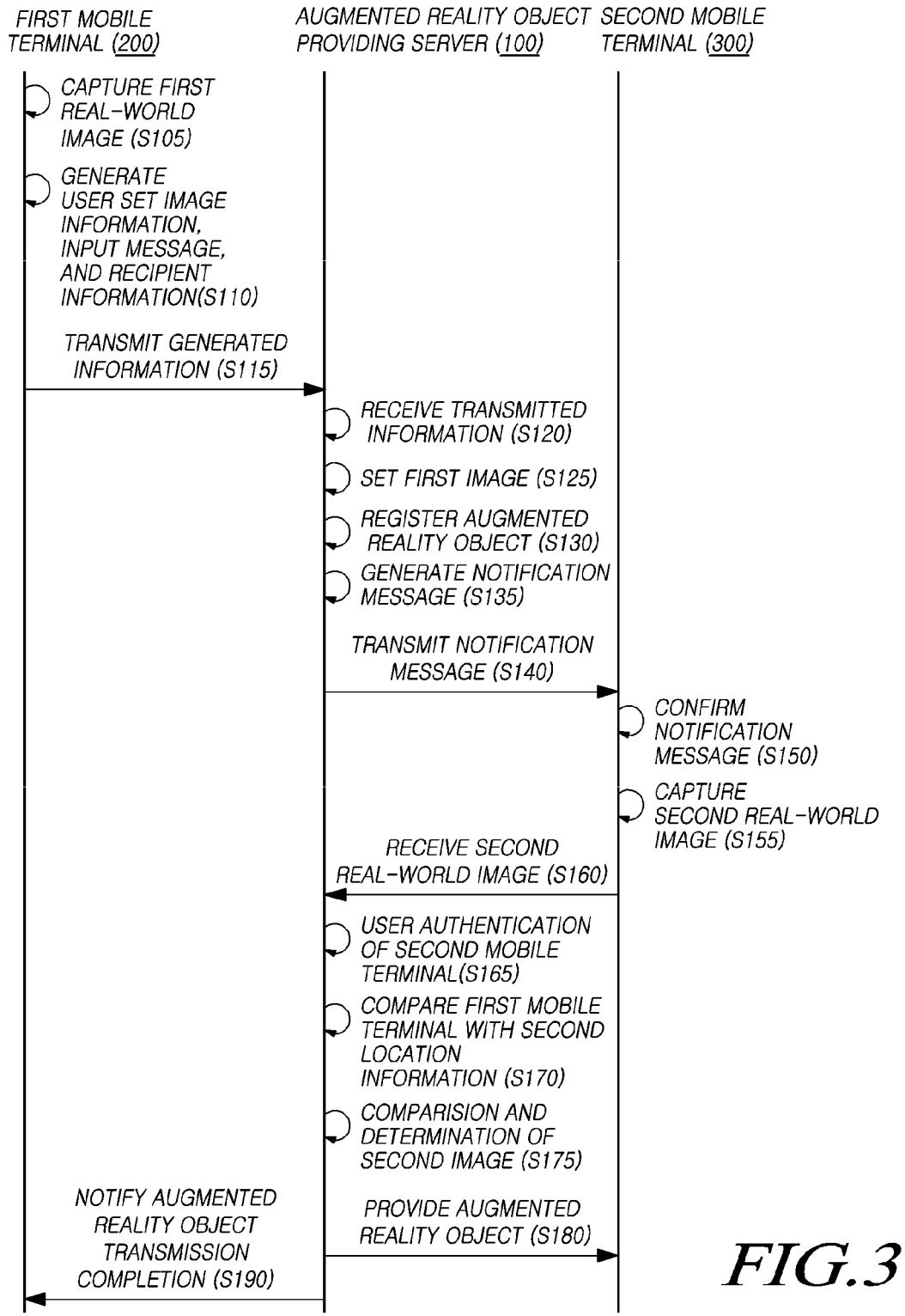
FIG. 3 is a flowchart illustrating a method in which the augmented reality object providing server transmits an augmented reality object according to an embodiment of the present disclosure.

That is, as illustrated in FIG. 3, if the message transmission module 140 of the augmented reality object providing server 100 directly transmits the notification message and the augmented reality object to the second mobile terminal 300, the message server 400 is not required.

Figure 4:
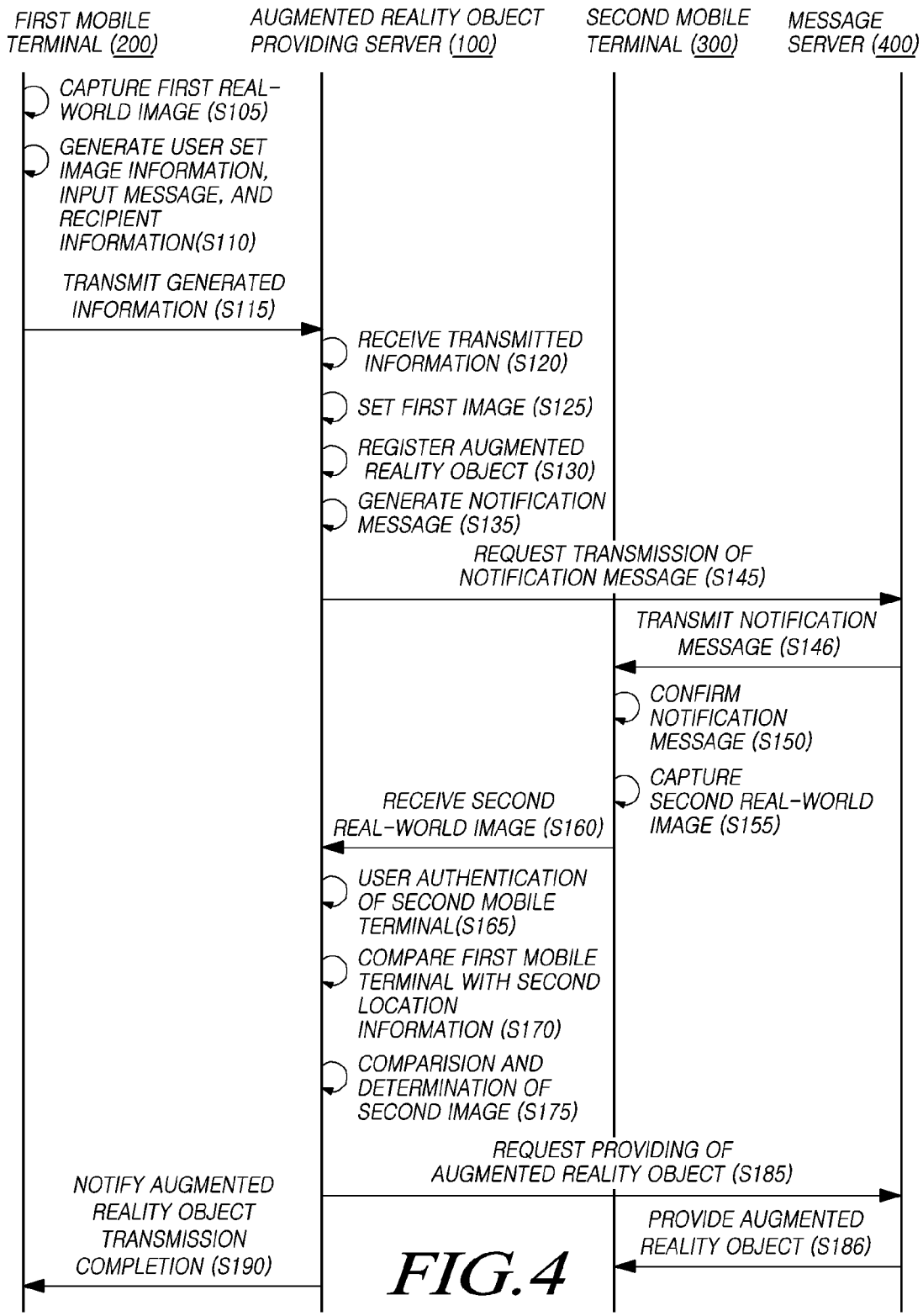
FIG. 4 is a flowchart illustrating a method in which a message server transmits an augmented reality object according to an embodiment of the present disclosure.

However, as illustrated in FIG. 4, if the message transmission module 140 of the augmented reality object providing server 100 requests the transmission of the notification message and the augmented reality object to the second mobile terminal 300, the message server 400 may receive the notification message and the augmented reality object from the message transmission module 140 and transmit the received notification message and augmented reality object to the second mobile terminal 300.

Figure 5:
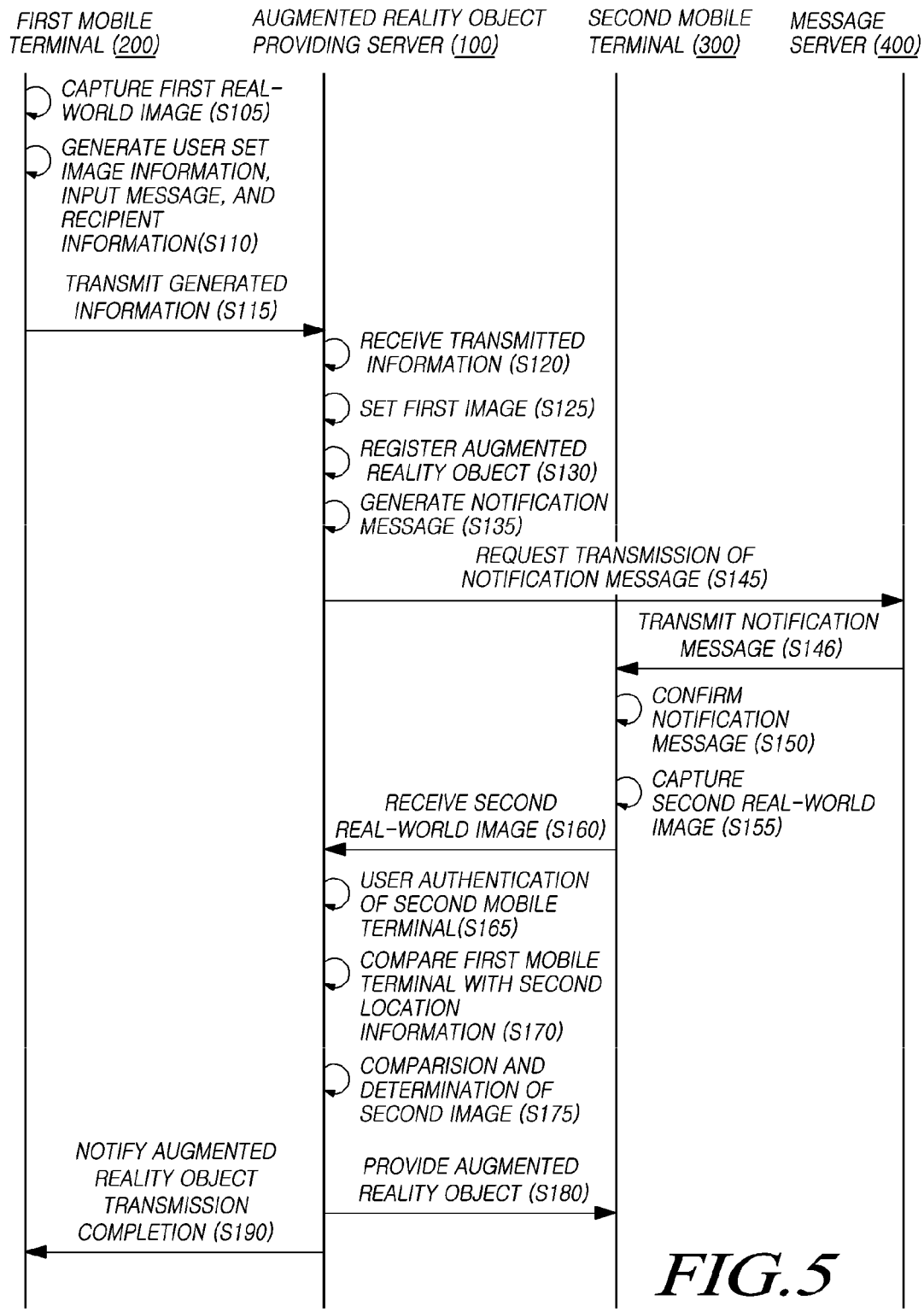
FIG. 5 is a flowchart illustrating a method for transmitting a notification message and the augmented reality object according to an embodiment of the present disclosure.

Furthermore, as illustrated in FIG. 5, if the message transmission module 140 of the augmented reality object providing server 100 requests the transmission of the notification message to the second mobile terminal 300, the message server 400 may receive the notification message from the message transmission module 140 and transmit the received notification message to the second mobile terminal 300 corresponding to recipient information received together with the notification message.

As a consequence, if recipient information capable of specifying the second mobile terminal 300 is recipient information stored in the application provided by the augmented reality object providing server 100, the message transmission module 140 of the augmented reality object providing server 100 directly transmits at least one of the notification message and the augmented reality object to the second mobile terminal 300.

However, if the recipient information capable of specifying the second mobile terminal 300 is recipient information stored in other applications, the message transmission module 140 of the augmented reality object providing server 100 transmits at least one of the notification message and the augmented reality object to the second mobile terminal 300 through the message server 400 corresponding to the other applications.

In such a case, the other applications correspond to applications capable of transmitting at least one of the notification message and the augmented reality object, and for example, correspond to various SNS applications such as Facebook, Twitter, Instagram, Google+, Kakaotalk, and Line. In addition, any applications may be used if they are installed in the first mobile terminal 200 and the second mobile terminal 300 and can transmit the notification message or the augmented reality object.

Figure 2:
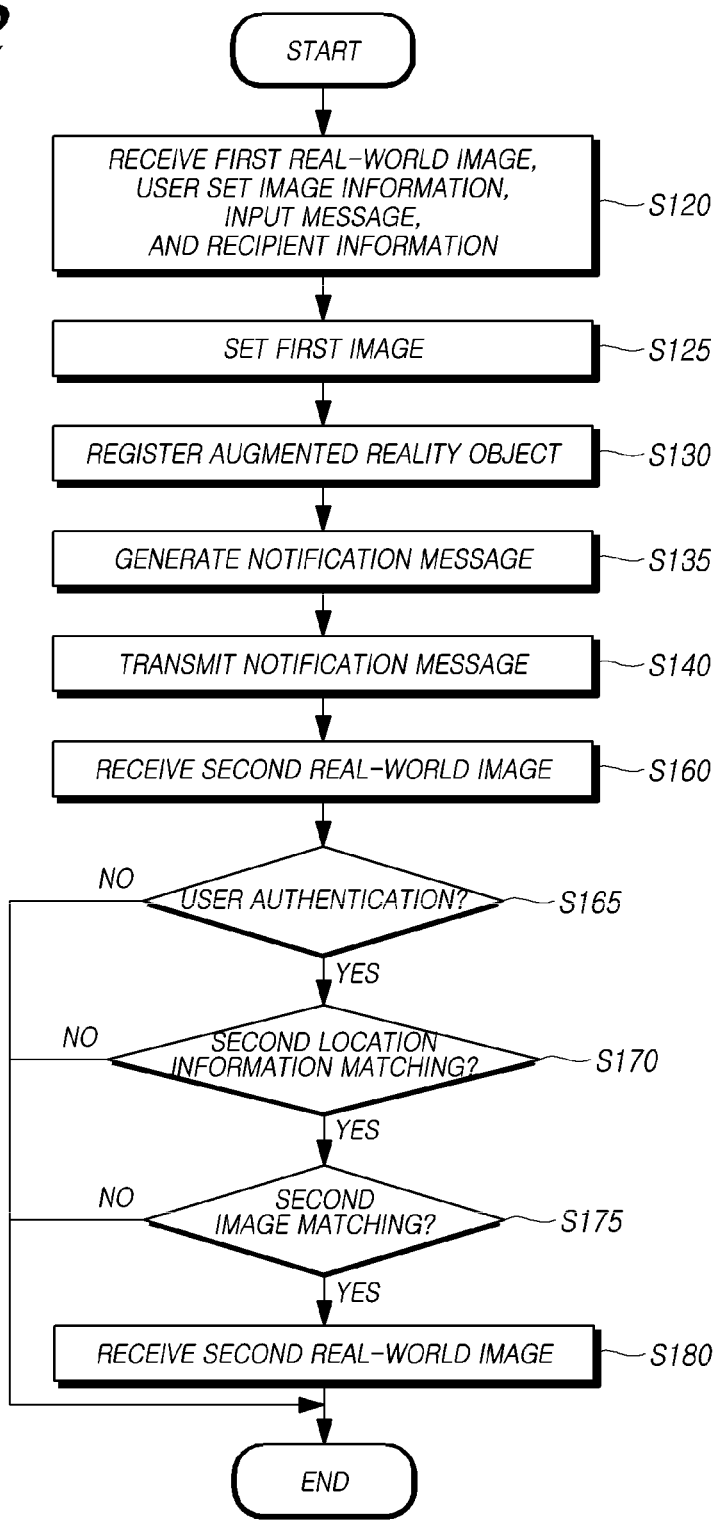
FIG. 2 is a flowchart illustrating an augmented reality object providing method according to the present disclosure.

FIG. 2 is a flowchart illustrating an augmented reality object providing method according to the present disclosure, FIG. 3 is a flowchart illustrating a method in which the augmented reality object providing server transmits the augmented reality object according to an embodiment of the present disclosure, FIG. 4 is a flowchart illustrating a method in which the message server transmits the augmented reality object according to an embodiment of the present disclosure, and FIG. 5 is a flowchart illustrating a method for transmitting the notification message and the augmented reality object according to an embodiment of the present disclosure. As illustrated in FIG. 2 to FIG. 5, the first mobile terminal 200 captures a first real-world image by using the camera module provided therein (S105). The first mobile terminal 200 generates user set image information of a user set image selected in the first real-world image, an input message, and recipient information by the input of the first user (S110).

The first mobile terminal 200 transmits the captured first real-world image, first location information on a first location in which the first real-world image has been captured, the user set image information, the input message, and the recipient information to the augmented reality object providing server 100 (S115). In such a case, the respective information may be transmitted from the first mobile terminal 200 to the augmented reality object providing server 100 at a time, or may be transmitted individually or in two or more bundles.

FIG. 6 is an exemplary diagram illustrating information generated by the first mobile terminal according to an embodiment of the present disclosure. The first mobile terminal 200 may capture the first real-world image 510 by using the camera module provided therein as illustrated in (a) of FIG. 6, and receive an input message 520 by the first user who is a user of the first mobile terminal 200 as illustrated in (b) of FIG. 6.

(b) of FIG. 6 is an exemplary diagram of an input message according to an embodiment of the present disclosure, and the input message is data inputted to or stored in the first mobile terminal 200 and includes at least one of text, image, animation, and sound (including voice). The image includes at least one of a static image and a dynamic image.

Furthermore, the first mobile terminal 200 receives the user set image information 530 by the first user as illustrated in (c) of FIG. 6. The user set image information illustrated in (c) of FIG. 6 shows an example of receiving the outermost edge of the user set image selected by the first user.

Although not illustrated in FIG. 6, the first mobile terminal 200 receives recipient information by the first user. Alternatively, at least one of a plurality of types of recipient information may be selected.

The augmented reality object providing server 100 receives the first real-world image transmitted from the first mobile terminal 200, the first location information on the location in which the first real-world image has been captured, the user set image information selected in the first real-world image, the input message, and the recipient information, and stores the received information in the storage module 120 (S120).

The control module 110 of the augmented reality object providing server 100 sets the user set image as the first image by using the first real-world image and the user set image information stored in the storage module 120 (S125).

Then, the control module 110 registers the stored input message as an augmented reality object for the first image (S130).

In the above, step S125 of setting the user set image as the first image is performed and then step S130 of registering the input message as the augmented reality object for the first image is performed. However, as needed, after step S130 is performed, step S125 may be performed.

FIG. 7 is an exemplary diagram illustrating that the augmented reality object providing server processes information received from the first mobile terminal according to an embodiment of the present disclosure. As illustrated in FIG. 7, the augmented reality object providing server 100 sets the user set image in the first real-world image 510 as the first image 630 by using the user set image information 530 among the received first real-world image 510, the first location information on the first location in which the first real-world image has been captured, the input message 520, and the user set image information 530, and registers the input message 520 as an augmented reality object 620.

The set first image 630 and the augmented reality object 620 are associated with each other and are transmitted to the second mobile terminal 300.

If the control module 110 requests the notification message generation module 130 to generate a notification message, the notification message generation module 130 generates the notification message by using the first location information or the set first image (S135).

Preferably, the notification message is generated after step S130 in which the augmented reality object is registered, but may be generated after step S125.

FIG. 8 is an exemplary diagram illustrating that the notification message generated by the augmented reality object providing server is outputted to the second mobile terminal according to an embodiment of the present disclosure. As illustrated in FIG. 8, the notification message 710 may include information in the form of text, and the first image 720 set in the augmented reality object providing server 100.

Furthermore, the notification message 710 may include various types of multimedia data such as image, animation, and sound (including voice) as well as the text.

In addition, the notification message 710 may include not only the fact that the user of the first mobile terminal 200 has registered the augmented reality object but also a request for a second real-world image obtained by capturing a real thing corresponding to the first image 720 to be transmitted together.

The notification message 710 may be transmitted to the second mobile terminal 300 through step S140 or step S145 after the notification message is generated in step S135 if a specific condition is satisfied.

In relation to the specific condition, the current location information is continuously received from the second mobile terminal 300 which is a target of the notification message. The location comparison module 170 compares the current location information received from the second mobile terminal 300 with the first location information on the first location in which the first real-world image 510 has been captured, and requests the message transmission module 140 to transmit the generated notification message 710 if a distance between the current location information and the first location information is within a critical region.

That is, if the second mobile terminal 300 is located within the critical region of the first location information on the first location in which the first real-world image has been captured, the notification message is transmitted, thereby inducing the transmission of the second real-world image from the second mobile terminal 300.

Then, the augmented reality object providing server 100 transmits the generated notification message to the second mobile terminal 300 corresponding to the recipient information. In such a case, the notification message may be transmitted in two methods.

In the first method, as illustrated in FIG. 3, the message transmission module 140 of the augmented reality object providing server 100 transmits the notification message to the second mobile terminal 300 corresponding to the recipient information (S140).

In the second method, as illustrated in FIG. 4 and FIG. 5, in the case of recipient information of various SNS applications other than the recipient information of the application provided by the augmented reality object providing server 100, the message transmission module 140 of the augmented reality object providing server 100 requests the message server 400 of an SNS application corresponding to the recipient information to transmit the notification message to the second mobile terminal 300 corresponding to the recipient information (S145).

Accordingly, the message server 400 receives the notification message and the recipient information from the message transmission module 140, and transmits the received notification message to the second mobile terminal 300 corresponding to the recipient information (S146).

The second mobile terminal 300 having received the notification message through step S140 or steps S145 and S146 may confirm the received notification message by using an application corresponding to the notification message (S150).

That is, if the notification message is received through step S140, the second mobile terminal 300 may confirm the notification message through the application provided by the augmented reality object providing server 100.

Furthermore, if the notification message is received through step S145 and step S146, the second mobile terminal 300 may confirm the notification message through the application corresponding to the recipient information (that is, the application corresponding to the message server 400).

Although not illustrated in FIG. 3 to FIG. 5, if the transmission of the notification message to the second mobile terminal 300 is completed through step S140 or steps S145 and S146, the message transmission module 140 of the augmented reality object providing server 100 may generate a notification message transmission completion message and transmit the notification message transmission completion message to the first mobile terminal 200.

After confirming the notification message in step S150, the second mobile terminal 300 captures a second real-world image by using the camera module provided therein (S155).

The second real-world image captured by the second mobile terminal 300 is obtained by capturing the real thing for the first image included in the notification message.

FIG. 9 is an exemplary diagram illustrating a screen obtained by capturing the second real-world image in the second mobile terminal according to an embodiment of the present disclosure. As illustrated in FIG. 9, the second mobile terminal 300 may generate the second real-world image 730 by capturing a real-world thing corresponding to the first image 720 transmitted as illustrated in FIG. 8.

Then, if the second mobile terminal 300 transmits the generated second real-world image and second location information on a second location in which the second real-world image has been captured to the augmented reality object providing server 100, the augmented reality object providing server 100 receives the second real-world image 730 and the second location information from the second mobile terminal 300 and stores the received second real-world image 730 and second location information in the storage module 120 (S160).

If the second real-world image 730 and the second location information are received from the second mobile terminal 300, the user authentication module 150 of the augmented reality object providing server 100 performs user authentication for determining whether the second mobile terminal 300 having transmitted the second real-world image corresponds to the recipient information under the control of the control module 110 (S165).

If the second mobile terminal 300 corresponds to the recipient information, step S170 is performed, and if the user authentication has failed, the user authentication module 150 transmits a notification indicating the failure of the user authentication to the second mobile terminal 300 by using the message transmission module 140.

If the second real-world image 730 and the second location information are received from the second mobile terminal 300, the location comparison module 170 of the augmented reality object providing server 100 performs a location comparison for determining whether the location in which the second real-world image has been captured is within a critical range set from the location in which the first real-world image has been captured under the control of the control module 110 (S170).

The first location information on the first real-world image and the second location information on the second real-world image may be included in the attribute information of the first real-world image and the second real-world image received from the first mobile terminal 200 and the second mobile terminal 300, respectively, and otherwise, each location information measured in the first mobile terminal 200 and the second mobile terminal 300 may be received and used.

If the location in which the second real-world image has been captured is not included within the critical range set from the location in which the first real-world image has been captured, the augmented reality object providing server 100 transmits a notification to the second mobile terminal 300 by using the message transmission module 140, the notification indicating the failure of the location comparison due to a difference with the location in which the first real-world image has been captured.

If the second real-world image 730 and the second location information are received from the second mobile terminal 300, the image comparison module 160 of the augmented reality object providing server 100 performs a comparison regarding whether the second image corresponding to the first image exists in the second real-world image under the control of the control module 110 (S175).

If the second image corresponding to the first image does not exist in the second real-world image, the augmented reality object providing server 100 transmits a notification to the second mobile terminal 300 by using the message transmission module 140, the notification indicating that the second real-world image does not match the first image.

In the above, step S165, step S170, and step S175 may be performed by changing the order as needed. For example, after step S165 of performing the user authentication, step S175 of comparing the presence of the second image may be performed and step S170 of comparing the location information may be performed. Alternatively, step S170, step S165, and step S175 may be performed in this order. Alternatively, step S170, step S175, and step S165 may be performed in this order. Alternatively, step S175, step S165, and step S170 may be performed in this order. Alternatively, step S175, step S170, and step S165 may be performed in this order. FIG. 10 is an exemplary diagram illustrating that the augmented reality object providing server compares the augmented reality object and the second real-world image with each other according to an embodiment of the present disclosure. The image comparison module 160 may determine whether the second image corresponding to the first image 630 set from the first real-world image exists in the second real-world image 730 received from the second mobile terminal 300.

As illustrated in (a) of FIG. 10, if the image corresponding to the first image 630 exists in the second real-world image 730, the message transmission module 140 of the augmented reality object providing server 100 transmits the augmented reality object 620 stored in the storage module 120 to the second mobile terminal 300 under the control of the control module 110.

In FIG. 10, step S165 and step S175 are not performed and the augmented reality object 620 is transmitted to the second mobile terminal 300 after step S170; however, any one of step S165 and step S175 may be additionally performed to transmit the augmented reality object 620 to the second mobile terminal 300.

The message transmission module 140 may transmit the augmented reality object 620 to the second mobile terminal 300 in two methods.

In the first method, as illustrated in FIG. 3 and FIG. 5, the message transmission module 140 of the augmented reality object providing server 100 transmits the augmented reality object to the second mobile terminal 300 corresponding to the recipient information and having transmitted the second real-world image (S180).

In the second method, as illustrated in FIG. 4, in the case of recipient information of any one of various SNS applications other than the recipient information of the application provided by the augmented reality object providing server 100, the message transmission module 140 of the augmented reality object providing server 100 requests the message server 400 of an SNS application corresponding to the recipient information to transmit the augmented reality object to the second mobile terminal 300 corresponding to the recipient information (S185).

Accordingly, the message server 400 receives the augmented reality object and the recipient information from the message transmission module 140, and transmits the received augmented reality object to the second mobile terminal 300 corresponding to the recipient information (S186).

Figure 11:
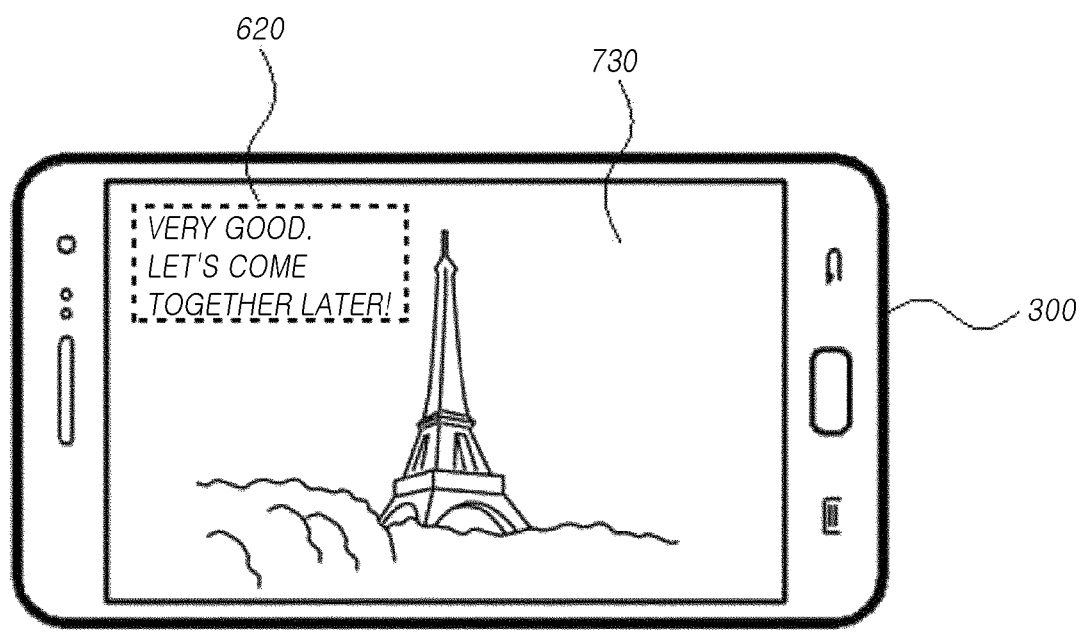
FIG. 11 is an exemplary diagram illustrating that the augmented reality object is outputted to the second mobile terminal according to an embodiment of the present disclosure.

FIG. 11 is an exemplary diagram illustrating that the augmented reality object is outputted to the second mobile terminal according to an embodiment of the present disclosure. As illustrated in FIG. 11, the message transmission module 140 of the augmented reality object providing server 100 or the second mobile terminal 300 having received the augmented reality object from the message server 400 output the captured second real-world image 730 and the augmented reality object 620, so that it is possible to confirm the input message, which has been registered as the augmented reality object by the first user of the first mobile terminal 200, in the augmented reality method.

If the transmission of the augmented reality object to the second mobile terminal 300 is completed through step S180 or steps S185 and S186 under the control of the control module 110, the message transmission module 140 of the augmented reality object providing server 100 may generate an augmented reality object transmission completion message and transmit the augmented reality object transmission completion message to the first mobile terminal 200 (S190).

Although the preferred embodiments of the present disclosure have been described for illustrative purposes, the present disclosure is not limited to such embodiments. A person having ordinary skill in the art will appreciate that various modifications and corrections are possible without departing from the technical scope of the present disclosure, and the technical scope of the present disclosure includes various modifications and corrections.

The invention claimed is:

1. An augmented reality object providing method using image authentication, comprising:
a first mobile terminal information reception step in which an augmented reality object providing server receives, from a first mobile terminal, a captured first real-world image, first location information on a first location in which the first real-world image has been captured, user set image information selected in the first real-world image, an input message, and at least one recipient information;
an image setting step in which the augmented reality object providing server sets a user set image included in the first real-world image as a first image by using the user set image information;

an augmented reality object registration step in which the augmented reality object providing server registers the input message inputted by a first user of the first mobile terminal as an augmented reality object for the first image;

a notification message transmission step in which the augmented reality object providing server generates a notification message and transmits the notification message to a second mobile terminal corresponding to the recipient information;

a second mobile terminal information reception step in which the augmented reality object providing server receives, from the second mobile terminal, a captured second real-world image and second location information on a second location in which the second real-world image has been captured;

a user authentication step in which the augmented reality object providing server determines whether the second mobile terminal corresponds to the recipient information;

a location comparison step in which the augmented reality object providing server determines whether the first location information on the first location in which the first real-world image has been captured and the second location information on the second location in which the second real-world image has been captured are within a preset critical range;

an image comparison step in which the augmented reality object providing server determines whether a second image corresponding to the first image exists in the second real-world image; and an augmented reality object transmission step in which, if it is determined that the second mobile terminal corresponds to the recipient information in the user authentication step, the first location information and the second location information are within the preset critical range in the location comparison step, and the second image corresponding to the first image exists in the image comparison step, the augmented reality object providing server transmits the augmented reality object corresponding to the first image to the second mobile terminal such that the augmented reality object is outputted in the second real-world image of the second mobile terminal.

2. The augmented reality object providing method using image authentication according to claim 1, wherein, in the location comparison step, the first location information is included in attribution information of the first real-world image and the second location information is included in attribution information of the second real-world image.

3. The augmented reality object providing method using image authentication according to claim 1, wherein, in the first mobile terminal information reception step, the user set image information includes at least one of a name of the user set image, a location of the user set image, an outmost edge of the user set image, and the user set image.

4. The augmented reality object providing method using image authentication according to claim 1, wherein, in the first mobile terminal information reception step, the input message is data inputted to or stored in the first mobile terminal and includes at least one of text, image, animation, and sound (including voice).

5. The augmented reality object providing method using image authentication according to claim 1, wherein, in the notification message transmission step, the notification message includes at least one of the first location information on the first location in which the first real-world image has been captured and the first image.

6. The augmented reality object providing method using image authentication according to claim 1, wherein, in the first mobile terminal information reception step, the recipient information is recipient information included in at least one of applications installed in the first mobile terminal.

7. The augmented reality object providing method using image authentication according to claim 6, wherein, in the notification message transmission step, the notification message is transmitted through an application server of an application corresponding to the recipient information.

8. The augmented reality object providing method using image authentication according to claim 1, wherein, in the notification message transmission step, the augmented reality object providing server compares current location information received from the second mobile terminal with the first location information, and if a distance between the current location information and the first location information is within a critical region, the augmented reality object providing server transmits the generated notification message to the second mobile terminal.

9. An augmented reality object providing server using image authentication, comprising:

a storage receives, from a first mobile terminal, a first real-world image, first location information on a first location in which the first real-world image has been captured, user set image information selected in the first real-world image, an input message, and at least one recipient information;

a controller that sets a user set image included in the first real-world image as a first image by using the user set image information, and registers the input message inputted by a first user of the first mobile terminal as an augmented reality object for the first image;

a notification message generator that generates a notification message;

a message transmitter that transmits the notification message to a second mobile terminal corresponding to the recipient information;

a user authenticator that determines whether the second mobile terminal corresponds to the recipient information if a captured second real-world image and second location information on a second location in which the second real-world image has been captured are received from the second mobile terminal;

a location comparator that determines whether the first location information and the second location information are within a preset critical range if the captured second real-world image and the second location information on the second location in which the second real-world image has been captured are received from the second mobile terminal; and an image comparator that determines whether a second image corresponding to the first image exists in the second real-world image if the captured second real-world image and the second location information on the second location in which the second real-world image has been captured are received from the second mobile terminal; and wherein, if the user authenticator determines that the second mobile terminal corresponds to the recipient information, the location comparator determines that the first location information and the second location information are within the preset critical range, and the image comparator determines that the second image corresponding to the first image exists, the message transmitter transmits the augmented reality object corresponding to the first image to the second mobile terminal such that the augmented reality object is outputted in the second real-world image of the second mobile terminal.

10. The augmented reality object providing server using image authentication according to claim 9, wherein the first location information is included in attribution information of the first real-world image and the second location information is included in attribution information of the second real-world image.

11. The augmented reality object providing server using image authentication according to claim 9, wherein the user set image information includes at least one of a name of the user set image, a location of the user set image, an outmost edge of the user set image, and the user set image.

12. The augmented reality object providing server using image authentication according to claim 9, wherein the input message is data inputted to or stored in the first mobile terminal and includes at least one of text, image, animation, and sound (including voice).

13. The augmented reality object providing server using image authentication according to claim 9, wherein the notification message includes at least one of the first location information on the first location in which the first real-world image has been captured and the first image.

14. The augmented reality object providing server using image authentication according to claim 9, wherein the recipient information is recipient information included in at least one of applications installed in the first mobile terminal.

15. The augmented reality object providing server using image authentication according to claim 14, wherein the message transmitter transmits the notification message through an application server of an application corresponding to the recipient information.

16. The augmented reality object providing server using image authentication according to claim 9, wherein, if the location comparator compares current location information received from the second mobile terminal with the first location information and determines that a distance between the current location information and the first location information is within a critical region, the message transmitter additionally transmits the notification message to the second mobile terminal.

* * * * *